May 29, 1934.　　　　G. B. WATKINS　　　　1,960,520
LAMINATED GLASS AND PROCESS OF PRODUCING THE SAME
Filed March 27, 1929
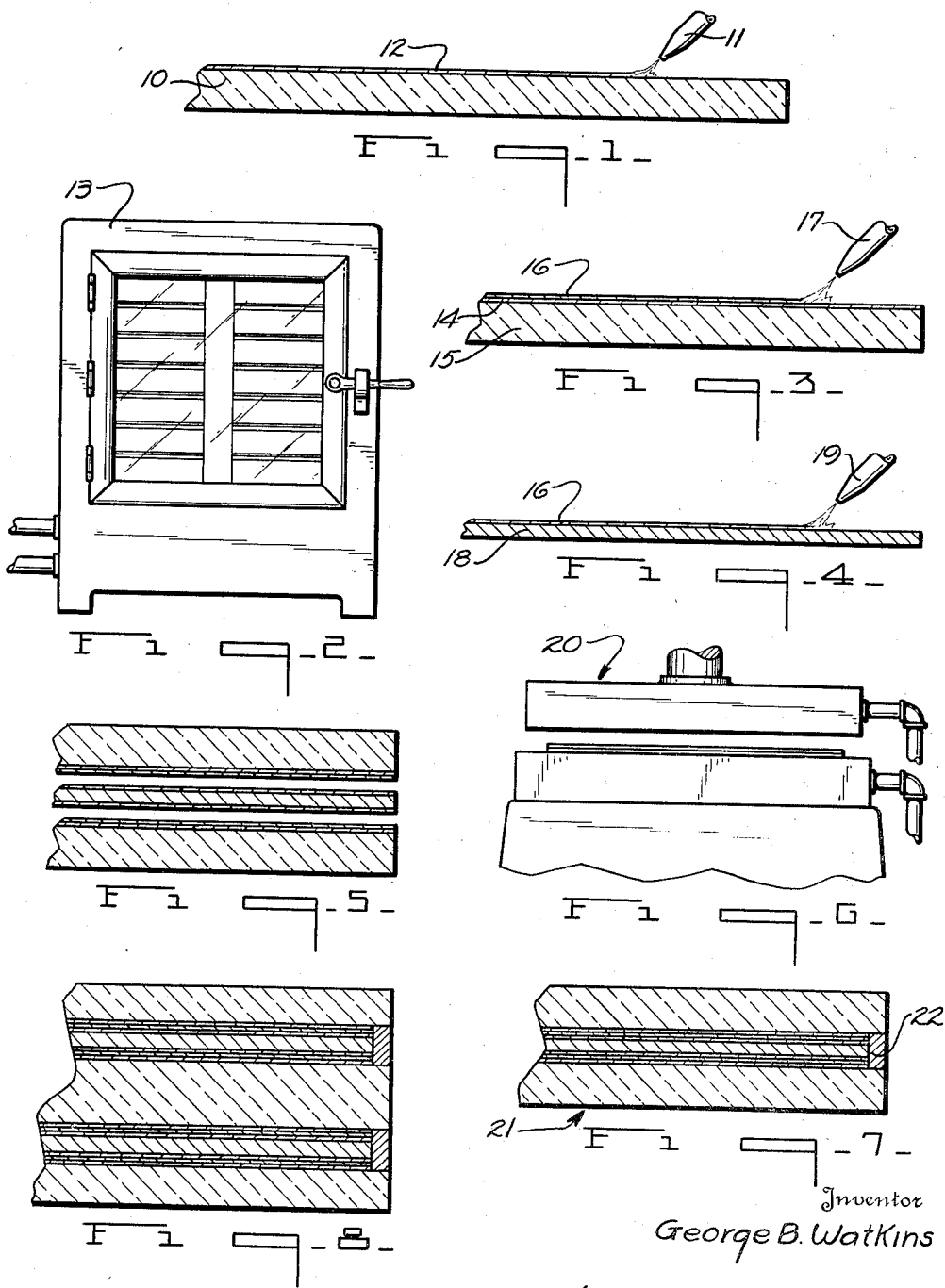
Inventor
George B. Watkins
By Frank Fraser,
Attorney Patented May 29, 1934

1,960,520

UNITED STATES PATENT OFFICE 1,960,520

LAMINATED GLASS AND PROCESS OF PRODUCING THE SAME

George B. Watkins, Toledo, Ohio, assignor to Libbey-Owens-Ford Glass Company, Toledo, Ohio, a corporation of Ohio Application March 27, 1929, Serial No. 350,167

8 Claims. (Cl. 49—81)

The present invention relates to laminated glass and to the process of producing the same.

Laminated or composite glass is commonly called in the art "non-shatterable" or "non-scatterable" glass. Such glass is ordinarily produced by uniting two or more sheets or plates of glass and one or more non-brittle membranes. The value of such a composite sheet of glass is dependent to a considerable degree upon the quality and permanency of the bond between the several laminations. It is essential that the bond be such that one or more of the glass sheets can be broken or shattered without separating from the non-brittle portion. The bond between the laminations, to be satisfactory from a commercial standpoint, must be such that it will not be adversely affected by climatic conditions encountered in actual use.

Regular commercial plate glass, regardless of the process by which it is made, contains at least some apparent waves. These waves are not ordinarily objectionable when such glass is used in single sheets and vision therethrough is relatively free from distortion. It has been found, however, that when such glass is used in the production of laminated glass by some processes, the waves are either accentuated, new waves introduced, or both.

It has also been found that laminated glass produced in accordance with some processes, subsequent to its manufacture, frequently develops a separation of the glass from the non-brittle substance. This condition is commonly referred to as "let-goes". They may occur around the marginal portions of the sheet and work inwardly thereof or may occur in any part of the composite sheet. The "let-goes" result from a breaking down of the bond between the laminations so that at the point of the let-go there is no further bond or union.

It has also been noticed that an undesirable condition may present itself in the composite sheet due to the appearance of bubbles. To unite two sheets of glass and a sheet of non-brittle material in a manner that an apparently excellent bond is obtained between the various laminations, offers no grave problem. That is, laminations can be bonded together by the aid of some binding material, the bond between the laminations to all intents and purposes appearing satisfactory upon the completion of the composite sheet at which time the composite sheet may be devoid of bubbles, let-goes, etc. If an improper bond inducing medium is used, such as one having a relatively low boiling point for instance, the non-brittle material or membrane used will have a tendency to extrude from between the glass during the pressing operation which sets up internal strains in the finished composite sheet, frequently causing the finished product to develop so-called "after cracks", that is, a breakage of one or more of the glass sheets.

The present invention contemplates the use of a bonding material or medium, or bond inducing medium for the various laminations which will produce a finished product or composite sheet adapted for general use under varying climatic conditions without developing undesirable defects such as bubbles, let-goes, and after cracks as pointed out above. With a bonding medium of this character, two or more sheets of glass and one or more membranes formed from a cellulose composition material or the like can be united, preferably under the combined action of heat and pressure, in a manner that a satisfactory bond will result.

The process is also such and the ingredients of a character that the finished product will not present an undesirable wavy condition when viewed at an angle (the customary way of examining glass) as the process and ingredients when applied in accordance with the present invention will tend to reduce the appearance of waves in the finished sheet to a minimum.

Other objects and advantages of the invention will become more apparent during the course of the following description when taken in connection with the accompanying drawing.

In the drawing wherein like numerals are employed to designate like parts throughout the same, Fig. 1 is a fragmentary sectional view illustrating the formation of a skin coat on a sheet of glass, Fig. 2 is a diagrammatic representation of a drying cabinet, Fig. 3 illustrates in section the application of the bond inducing medium to the skin coat, Fig. 4 represents diagrammatically the application of the bond inducing medium to the non-brittle sheet, Fig. 5 represents in section the various laminations after they have been suitably treated and arranged in proper superimposed relation but before they have been united, Fig. 6 is a diagrammatic representation of a form of pressing means that may be used, Fig. 7 is a fragmentary vertical sectional view of one form of commercial product, and Fig. 8 is a similar view of another type of composite glass.

Referring to the drawing, the numeral 10 designates a sheet of preferably transparent glass whose surfaces may be ground or polished, or not, as desired. If laminated glass is made from sheet glass, whose surfaces have been ground and polished, it is rather expected that the sheet of laminated glass will not be of exact uniform thickness throughout. If, on the other hand, the laminated glass is produced from plate glass, whose surfaces have been ground and polished, the purchaser expects a sheet of laminated glass substantially uniform throughout its entire thickness and with very little, if any, wavy appearance.

I have found that all commercial plate glass is wavy to a slight degree at least. It will be understood that when speaking of waves and other irregularities in the glass sheets and laminated sheet, the terms are relative and even slight deflections in the surface of the glass are considered as giving a wavy condition.

In the past it does not seem that the plate glass manufacturers have been worried over this condition because a single sheet of plate glass ordinarily appears, when used alone, to the laymen at least, perfectly uniform in thickness and devoid of surface irregularities. I have found, however, that when two or more sheets of plate glass are used in the production of a laminated glass, the finished composite structure will, in a great many instances, appear more wavy than either of the two sheets when examined alone. I have also determined that the method and ingredients used in the manufacture of the composite sheet has, to a considerable extent, an influence on the appearance of the finished sheet. the wavy appearance is not ordinarily noticeable when viewing the sheet in a line substantially at right angles to the surface of the sheets. The sheet is usually examined for this wavy condition at a point almost in line with the edge of the sheet.

Assuming that the sheet 10 is plate glass, it is, of course, desirable that a good quality of glass be selected, although this invention is not limited for use when best glass only is employed. The numeral 11 designates the nozzle of a spray gun or similar device which is designed to spray a deposit of material 12 on the surface of the glass sheet 10. Although the sheet 10 is illustrated as being disposed in a horizontal plane, it will be obvious that the sheet can be arranged in a suitable rack in a vertical or inclined position. The deposit of material 12 is, of course, when sprayed, in solution form and the solution may be created from a cellulose composition material, a resin material, either natural or synthetic, a mixture of the two, or any other suitable material. The materials used are preferably dissolved in a relatively low boiling point, volatile solvent so that after the liquid has been sprayed upon the glass sheet, it will dry relatively rapidly. A suitable percentage of high boiling point solvent or plasticizing agent may also be included in the solution.

After the deposit has been made upon the glass sheet, it is preferably placed in a drying cabinet 13, the temperature and humidity of which can be accurately controlled to give proper drying of the deposit. This treatment produces what is known in the art as a "skin coat" 14 shown in Fig. 3. The skin coat 14 is closely adherent to the surface of the glass sheet 15. In Fig. 3, the skin coat is being treated with a spray of my improved liquid 16 by means of a spray gun or the like 17. In Fig. 4, a sheet of non-brittle plastic material 18 is likewise sprayed with the material 16 by means of the spray gun 19.

The liquid 16 plays an extremely important part in the character of the finished sheet, both as regards the bond between the laminations and the appearance of the sheet from a wavy standpoint. I have found that a mixture of an ester of phthalic acid, such as dibutyl phthalate and a polyglcol derivative, such as monoethyl ether of diethylene glycol is commonly called carbitol. Although obviously I do not desire to limit myself to the exact quantities of these two ingredients that can be mixed together, I have found that a fifty-fifty mixture of the two works well. However, a third or even a fourth substance might be added without voiding the essence of this invention. As a matter of fact, the following mixture also gives exceptionally good results: 40% monoethyl ether of diethylene glycol (carbitol) 30% monobutyl ether of diethylene glycol (butyl carbitol); and 30% dibutyl phthalate.

After the skin coat 14 and non-brittle plastic sheet 18 have been suitably sprayed, they are arranged in proper superimposed relation as shown at 15 where the laminations are indicated in spaced relation for the purposes of illustration. The laminations when so placed form what is known in the art as a "sandwich", and this sandwich is placed in the press designated in its entirety by the numeral 20 where it is subjected to the combined action of heat and pressure. In Fig. 7, a sheet of laminated glass 21 is illustrated being provided with a seal 22 to protect the bond between the laminations.

The sheet of non-brittle plastic material 18 may be formed from a cellulose composition material, synthetic resin, or a combination of the two.

The monoethyl ether of diethylene glycol or other polyglycol derivative is a relatively more active solvent or plasticizing agent than the ester of phthalic acid. It also has a relatively low vapor pressure which is sufficiently low that the finished composite sheet will not develop bubbles when placed in actual use. A decided advantage in the present process is that the sheets of glass and non-brittle plastic material can be sprayed in one operation, immediately assembled to produce the sandwich, and because of the slight surface plasticization of the skin coats and non-brittle sheet, they will become tacky, causing the laminations of the sandwich to adhere slightly to one another so that slippage between the laminations is not encountered when in the press. Further, because the right amount of liquid can readily be sprayed and the sheets assembled in sandwich form before pressing, the sandwich can be set aside before pressing for varying times without affecting the quality of the bond. In other words, due to the characteristics of the liquid mixture, the laminations can be sprayed with such mixture and then arranged in sandwich form. The sandwich can be placed in the press a minute or two after its formation or its entrance into the press can be delayed for as much as an hour and the finished sheet will not differ, at least noticeably differ, from the sheet formed from the sandwich pressed within two or three minutes after its assembly.

I have found that a sheet of laminated glass produced in accordance with the above will be relatively free from wavy appearance. Although there may be reasons of which I am not aware as to why this process and use of this liquid will give such a desirable sheet, I am of the opinion that the presence of the monoethyl ether of diethylene glycol in the mixture causes a slight pitting of the celluloid and skin coats when sprayed thereon. As a matter of fact, the spray is so controlled as to size and speed that this slight pitting is permitted. The consequent roughing of the surfaces upon which the liquid is deposited is believed to have a considerable bearing on the appearance of the finished sheet, and in the present case a proper control of the spray gives a very satisfactory commercial product.

There are two aspects as to the question of wavy appearance in laminated glass. First, the nature of the laminated sheet may be such as to merely accentuate the waves already present in the glass sheets used; and secondly, additional waves may be introduced into the sheets by deflection thereof during the making of the laminated glass. Laminated glass made in accordance with the above does not seem to accentuate the waves already in the glass sheets, nor is it believed that waves are introduced into the sheet during its manufacture.

Although the mixture 16, when properly sprayed, will pit or bite the surface of the skin coat and non-brittle sheet, the liquid does not cause any apparent flowing of the non-brittle sheet and therefore the tendency toward after cracks is not encountered.

The sheet may be subjected to a pressure of approximately 200 pounds to the square inch, while in the press for a period of eight minutes at a temperature of 240° Fahrenheit. Large quantities of glass have been made in accordance with this cycle, but obviously slight changes at least can be made without defeating the present invention.

Fig. 8 shows a sheet of "bullet-proof" glass made in a manner similar to the sheet 21 in Fig. 7.

The drawing shows the use of skin coats on the glass sheets and the above description deals with their use, but this invention also embraces the manufacture of laminated glass wherein no skin coats are used. I have actually made large quantities of laminated glass without the skin coats as well as with them. When no skin coats are used, it is preferred that the bond inducing medium 16 be sprayed directly upon the surfaces of the glass sheets as well as upon the faces of the non-brittle membrane 18.

As above pointed out, the surfaces of the non-brittle plastic sheet are preferably and purposely pitted slightly or roughened, but it will be understood that such treatment does not adversely affect transparency of the finished sheet or clearness of vision therethrough.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing laminated glass, consisting in spraying a sheet of non-brittle plastic material with a bond inducing medium in a manner that the surfaces of the sheet become pitted, then interposing said sheet between two glass sheets to form a sandwich, and then applying heat and pressure to the sandwich to produce a composite structure.

2. The process of producing laminated glass, consisting in spraying a sheet of non-brittle plastic material with a bond inducing medium in a manner that the surfaces of the sheet become pitted, spraying one surface each of two sheets of glass with the bond inducing medium, then interposing the sheet of plastic material between the wetted surfaces of the glass sheets to form a sandwich, and then applying heat and pressure to the sandwich to produce a composite structure.

3. The process of producing laminated glass, consisting in creating skin coats on one surface each of two sheets of glass, then spraying the surfaces of a non-brittle plastic sheet with a bond inducing medium in a manner that they become pitted, likewise spraying the skin coats, then interposing the plastic sheet between the skin coated surfaces of the glass sheets to form a sandwich, and then applying heat and pressure to the sandwich to produce a composite sheet.

4. As a new article of manufacture, a sheet of laminated glass consisting of two or more sheets of glass with an interposed layer of cellulose ester treated with a mixture consisting of approximately the following parts: 40% monoethyl ether of diethylene glycol, 30% monobutyl ether of diethylene glycol, and 30% dibutyl phthalate.

5. As a new article of manufacture, a sheet of laminated glass consisting of two sheets of glass with an interposed layer of cellulose ester treated with a mixture of an ester of phthalic acid and a polyglycol derivative.

6. As a new article of manufacture, a sheet of laminated glass consisting of two sheets of glass with an interposed layer of cellulose ester treated with a mixture of dibutyl phthalate and a polyglycol derivative.

7. As a new article of manufacture, a sheet of laminated glass consisting of two sheets of glass with an interposed layer of cellulose ester treated with a mixture of an ester of phthalic acid and monoethyl ether of diethylene glycol.

8. As a new article of manufacture, a sheet of laminated glass consisting of two sheets of glass with an interposed layer of cellulose ester treated with a mixture of an ester of phthalic acid, monoethyl ether of diethylene glycol, and monobutyl ether of diethylene glycol.

GEORGE B. WATKINS.